US006802055B2

(12) United States Patent
Jade et al.

(10) Patent No.: US 6,802,055 B2
(45) Date of Patent: Oct. 5, 2004

(54) CAPTURING GRAPHICS PRIMITIVES ASSOCIATED WITH ANY DISPLAY OBJECT RENDERED TO A GRAPHICAL USER INTERFACE

(75) Inventors: Shashidhar P. Jade, Redmond, WA (US); Peter A. Thompson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 389 days.

(21) Appl. No.: 09/892,989

(22) Filed: Jun. 27, 2001

(65) Prior Publication Data

US 2003/0001854 A1 Jan. 2, 2003

(51) Int. Cl.[7] .................................................. G06F 9/45
(52) U.S. Cl. ...................... 717/130; 717/107; 717/125; 717/131; 345/619
(58) Field of Search .................. 717/104–113, 120–135, 717/158–159, 174–178; 345/619, 771–773; 702/122–123; 709/223–224; 714/34–35, 38–39

(56) References Cited

U.S. PATENT DOCUMENTS 6,064,381 A  *  5/2000  Harel ......................... 345/705
6,091,422 A  *  7/2000  Ouaknine et al. ........... 345/419
6,314,470 B1 * 11/2001  Ward et al. .................. 709/328

OTHER PUBLICATIONS

Richter Jeffrey, Programming Applications Microsoft Windows, Fouth Edition, Microsoft Co., pp.: 794–800, Sep. 1999.*

Dmitri, "Spying on COM Objects", Windows Developer's Journal, pp. 1–14, Jul. 1999.*

* cited by examiner

Primary Examiner—Tuan Dam
Assistant Examiner—Ted T. Vo
(74) Attorney, Agent, or Firm—Leydig, Voit & Mayer, Ltd.

(57) ABSTRACT

The present invention provides a mechanism for capturing the one or more graphics primitives drawn to a user interface by an application in execution is presented. A calling process invokes an injection component to inject a spy component into a target process. Once the spy component is injected, it installs patches and hook functions into the executable code of the operating system API's that relate to the output of graphics primitives to the graphical user interface. The hook functions monitor operating system messages generated during the execution of the target process/application, while the patches allow for the capture of graphics primitives and attributes associated with such graphics primitives. Whenever a display object is rendered to an interface screen as a result of an invoked action within the target process, the hook functions are called to capture the operating system messages passed, and the patches capture the graphics primitives that are drawn to the screen to render the display object. This information is then packaged and delivered to the calling process for processing. Because the graphics primitives and attributes associated with such graphics primitives are captured in connection with the operating system messages passed during process execution, the calling process is able to obtain complete information about any viewable or executable object displayed by the target process.

35 Claims, 5 Drawing Sheets

CAPTURING GRAPHICS PRIMITIVES ASSOCIATED WITH ANY DISPLAY OBJECT RENDERED TO A GRAPHICAL USER INTERFACE

TECHNICAL FIELD

This invention relates generally to methods and systems for retrieving information descriptive of graphic elements that are displayed to a user interface and, more particularly, relates to methods and systems for retrieving graphics primitives and associated attributes of such graphics primitives of a display object rendered to a user interface.

BACKGROUND OF THE INVENTION

To successfully compete in the global market, a company's advertising literature and products must be easily understood by everyone, regardless of language or cultural differences. This requirement is perhaps most apparent within the vast software technology market, where software tools such as Microsoft Word, are commonplace on a global scale and must be comprehensible to users of any culture. The need for the accurate representation of language within software products marketed and sold worldwide is the essence of the localization industry. Localization of a product is the accurate translation and adaptation of any software or executable/viewable code into the language of the locality into which the product is being marketed and sold.

In order to work effectively across geographic and cultural borders, a localized software product must have the highest quality translation from a source language to a native or local language while retaining the functionality of the original product. The layout of text within a graphical user interface (GUI) is one of the biggest obstacles to overcome when localizing a product because the localized version of code must have the same general appearance and meaning as the original. This requires that the localization tool used to perform the translation be able to completely access and receive as input all of the graphics primitives that are rendered to the user interface screen during the execution of the software application. A graphics primitive is a drawing element, such as a text character, line, arc, polygon, etc., that is drawn to a user interface according to the specific function calls and mechanisms of the operating system. Each graphics primitive has its own set of attributes that define its appearance and/or style within the user interface. These attributes include visual and stylistic characteristics such as the text style or font, line length and style, arc length, etc. In GUI based software applications, multiple graphics primitives are combined to create the various display objects (e.g. buttons, menus, dialogue boxes, etc.) that are displayed to the user when they are using the application.

Because a typical application can include many different display objects, the graphics primitives that comprise the objects provide the primary information and data to be localized. For instance, a display object such as a dialog box can include a data entry field, user buttons containing text characters or strings, and/or other graphics primitives. To properly translate the text strings, the localization tool must be able to access all of the text primitives for the dialog box. Likewise, the specific attributes of the button, such as the length and shape of the button, must be known in order to account for changes in the length of a string due to translation. Once the graphics primitives that comprise the various display objects are determined, they can be localized accordingly, and the user interface of the application as a whole can be modified to suit the intended locality.

The graphics primitives that comprise the various display objects within an application can be accessed by conventional means. In Windows based applications for example, the graphics primitives are indicated by a resource file (*.res) that is stored within the application's executable (*.exe). Resource files are simply plain text scripts that indicate the various resources required for the application to run successfully, and can be viewed with a standard resource editor/viewer tool. The resource files are converted into a binary representation at compile time, and then merged into the executable image of the application during runtime. Resource types include text string tables, which contain the various text strings that are displayed by the application during runtime. Other resource types often required by an application include menus, dialog boxes, cursors, icons, toolbars, bitmaps and other display objects composed of one or more graphics primitives. The resource files provide access to all of the display objects, and consequently the graphics primitives associated with the application.

Despite the extensive information provided from the resource files, however, many localization errors still occur because one or more text strings are missed during the localization process. This is because standard methods of capturing graphics primitives and associated attributes of such graphics primitives are limited to only those display objects that are standard objects of the operating system (OS). Yet, there are many GUI based software applications that contain "custom-class" or "owner-draw" controls. These types of controls represent customized display objects that perform special functions or that have attributes that differ from the standard set of objects provided by the OS. So, while these customized objects are indicated as resources of the application within the resource file, the specific graphics primitives and associated attributes of the primitives that comprise the objects cannot be obtained directly from the resource file for localization. Rather, the primitives of customized display objects cannot be revealed until the object is invoked by the application during runtime.

Access to the graphics primitives that comprise the various display objects within the application, however, is still not enough to ensure a literal translation of a software product. The localization tool must also be able to know where and how the various text strings indicated in the resource file are used within the application. As described, the resource file indicates all of the graphics primitives relative to the executable application, and includes a text string table that contains the various literal strings and text characters displayed by the application during runtime. While the strings within the table can be easily accessed and localized accordingly, the table does not explicitly indicate the display object that a particular string corresponds to. The actual usage, or context of the string cannot be determined until it is displayed by the application during runtime. Context refers specifically to any information that allows the localization tool to account for the differences in meaning that occur when the same string or phrase is displayed in different ways within the application. For example, the term 'O.K.' may have a different meaning as it appears in a dialogue box than in a pull-down menu.

In addition to having accurately translated strings that are used in the correct context, the localized product must also maintain the same font properties as the original application. For instance, a button within the original application having text that reads "EXIT" should read as "SALIDA" when localized for Spanish speaking users. The literal meaning of the text as well as the font properties, which in this case are Times New Roman, bold and italicize to name a few, should be maintained from one version to the next. However, if the localized button reads as "SALIDA", the intentional emphasis placed on the original text is lost. This can cause problems in applications where varying font sizes, typeface, and styles are required to effectively convey information to a user of the application. Unfortunately, there is no convenient way for the font properties of text strings to be captured during the localization process, such as from the resource file. This is because the font properties (which are attributes of a text primitive) are generally stored within a temporary data structure allocated for the string known as a device context. The information maintained within this data structure, including the font properties, is discarded by the application from memory after the text is drawn to the screen. Again, this information can only be determined during the actual runtime of the application.

To overcome the limitations discussed above, a way is needed to easily access the graphics primitives and associated attributes of any display object (standard and non-standard) called during the execution of an application. Likewise, a convenient means of determining the context of the text strings that get displayed to a user during the execution of the application is necessary to ensure that the text strings are associated with the correct display object. A way to capture the font properties of a text string or character is also needed so that this information is made available with the other attributes of a graphics primitive.

SUMMARY OF THE INVENTION

The present invention provides a mechanism for capturing the one or more graphics primitives associated with an application as it is in execution. Moreover, the invention allows for the detection and retrieval of the unique attributes of the one or more graphics primitives as they are drawn to a graphical user interface. These graphic capturing techniques can be applied directly to any controls, buttons, windows and/or any other display objects that can be invoked by an application, including those that are custom drawn or non-standard with respect to the operating system.

A calling process, such as a localization tool, utilizes the invention to capture graphics primitives, such as text strings, that are displayed to the screen by a target process during runtime. The target process is any computer implemented process or software application that requires a graphical user interface (GUI) to display visual information to a computer user. In operation, the calling process invokes an injection DLL (Dynamic Link Library) to inject a spy DLL into the executable code of the target process. Once the spy DLL is injected, it installs patches and hook functions into the operating system API's (Application Programming Interfaces) that have routines for displaying text to a graphical user interface. The hook functions monitor the operating system messages generated during the execution of the target application, while the patches allow for the capture of the various graphics primitives and associated attributes of the primitives that are drawn to the user interface.

Whenever a display object is rendered to the GUI by the target application as a result of an invoked action (e.g. mouse-clicking, function key), the hook functions are called to capture the operating system messages passed and the patches capture the graphics primitives of the object. The patches also capture the unique attributes of the graphics primitives, including the font properties of a displayed text. This captured information is then packaged and delivered to the calling process for processing. Because the graphics primitives are captured in connection with the operating system messages passed during runtime, the calling process obtains complete information about any viewable or executable objects displayed by the target process. The operating system messages provide a context for a captured graphics primitive, which allows the calling process to better associate a captured primitive with a specific display object. As an example, a text string primitive can be easily associated with a specific dialogue box that is called by the application as a result of a user action. Furthermore, the invention allows the graphics primitives and associated attributes of custom/user drawn objects to be captured. This overcomes the limitations imposed by the operating system on allowing the unique attributes of non-standard objects to be exposed by the resource file for the application.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
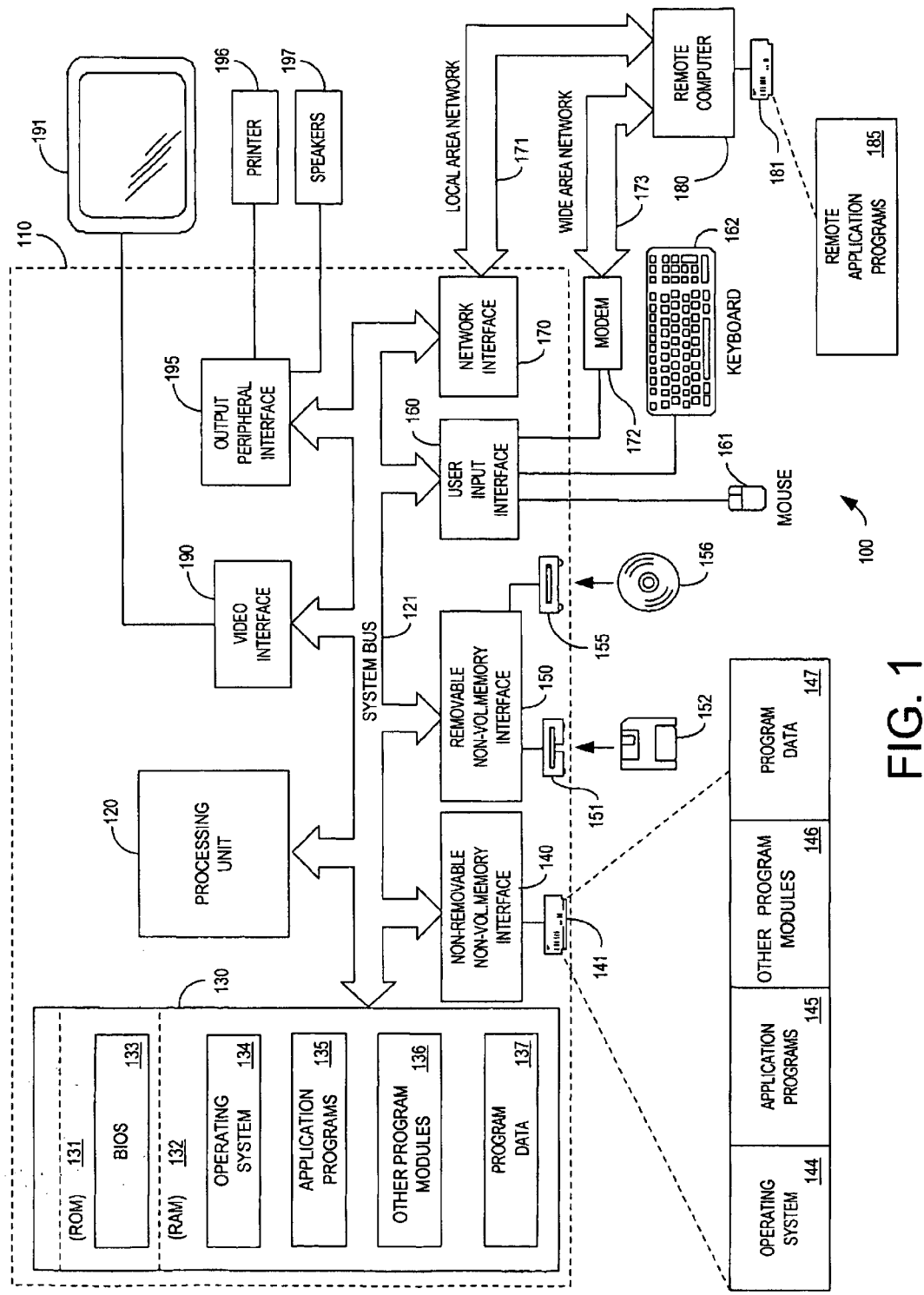
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention relates to the capture and retrieval of the one or more graphics primitives that comprise a display object rendered to a graphical user interface by an application executing on the operating system 100. In the context of a graphical user interface, a display object is any drawing element that can be viewed by a user of a computer from a user interface screen (monitor) 191. More specifically, a display object refers to any drawing element that displays lines, text, images and other visible information to a graphical user interface (GUI). This includes, but is not limited to control and dialogue boxes, functional buttons, menu screens, combo boxes, and any graphical windows that are capable of being executed or invoked by an application running on the operating system 144. The graphics primitives that comprise the display object can be easily captured by practicing the methods of the invention, and subsequently returned to a calling process such as a localization tool or text-to-speech application for processing.

As described herein, the term "process" refers to an executable procedure, computing task, or part of a program that is executed by the computer 110. More specifically, a "calling process" is the process that utilizes the invention to capture the one or more graphics primitives of a display object that can be invoked by the various application programs 145 on the computer. The graphics primitives include drawing elements such as text characters or strings, lines, arcs, polygons, etc., and have associated attributes that define its visual appearance such as font size, line length, and arc length. The calling process can be any computer executable process, such as a localization tool or text-to-speech application that requires access to the drawing elements that are drawn to a graphical user interface by an application. Similarly, a "target application" or "target process" refers to the particular process, executable procedure, or application that a particular text string is to be captured from. In accordance with the invention, the calling process captures the one or more graphic primitives and associated attributes of the primitives that are displayed to a graphical user interface by the target application/process.

Display objects are commonly used within operating systems that support a graphical user interface. For example, in the Windows operating system, a standard set of display objects are available for use by the various application programs 145 that execute on the computer 110. In this way, a dialog box or menu display used by Microsoft Word for example, can also be called upon by Microsoft Excel to provide the same functional purpose. Standard display objects have a mode of operation that is defined according to the functions and mechanisms of the operating system, while the appearance of the display object is defined according to one or more graphics primitives that comprise the object. For instance, multiple lines, curves, and text characters can be combined to yield a user button. The appearance of the button is further determined by the specific attributes of the graphics primitives such as the font type, text alignment and placement, line thickness and shading, style, etc. Such graphics primitives and associated attributes can be easily determined through conventional methods, such as by accessing the resource file of the target application. However, access to the unique attributes of objects that are non-standard with respect to the operating system cannot be determined through conventional means.

In contrast, the present invention allows for the capture of the graphics primitives and associated attributes of both standard and non-standard display objects. Non-standard display objects typically fall into two categories, namely owner-draw controls or custom class objects. Owner-draw controls are display objects that have a customized style or appearance and perform tasks that differ from that of the standard objects. Similarly, custom class objects consist of unique functions or class names that are not recognized by the OS. Because these types of objects are not standard with respect to the operating system, their unique attributes associated with these objects cannot be determined by conventional methods. For instance, the resource file of an application having an owner-draw or custom class control does not reveal the specific graphics primitives or attributes of the object. Customized features cannot be determined directly from the static (non-executed) resource file. Rather, they can only be realized once the display object is invoked during the runtime of the application. Current methods of capturing graphics primitives are limited to the information contained within the "static" resource file, and do not support the capture of "dynamic" (runtime) information. The invention overcomes this limitation by allowing the graphics primitives and unique attributes of customized display objects to be captured during runtime execution of the application.

Still further, the invention also relates to a method and system for capturing "context information" associated with any text that is displayed during the execution of a process or application. In general, context information is information that is descriptive of the display object in which the text appears. This descriptive information can include parameters such as the type of display object (dialog box, menu, window, etc.) and its current state (active/inactive). Context information also includes system information such as the API calls and/or function calls made by the target application to render the display object to a user interface, the object handle or resource ID, the specific location of files called during execution of the display object, and any other information that provides a general context for the text that is displayed to the user interface screen 191 during the execution of the target process or application. Context information is obtained by intercepting the system messages that are passed between the target application and the operating system during the execution of the application. Capturing the text in connection with the operating system messages provides a general context for the text, and allows the information to be associated with a specific task or process within the target application.

The computing system environment 100 includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
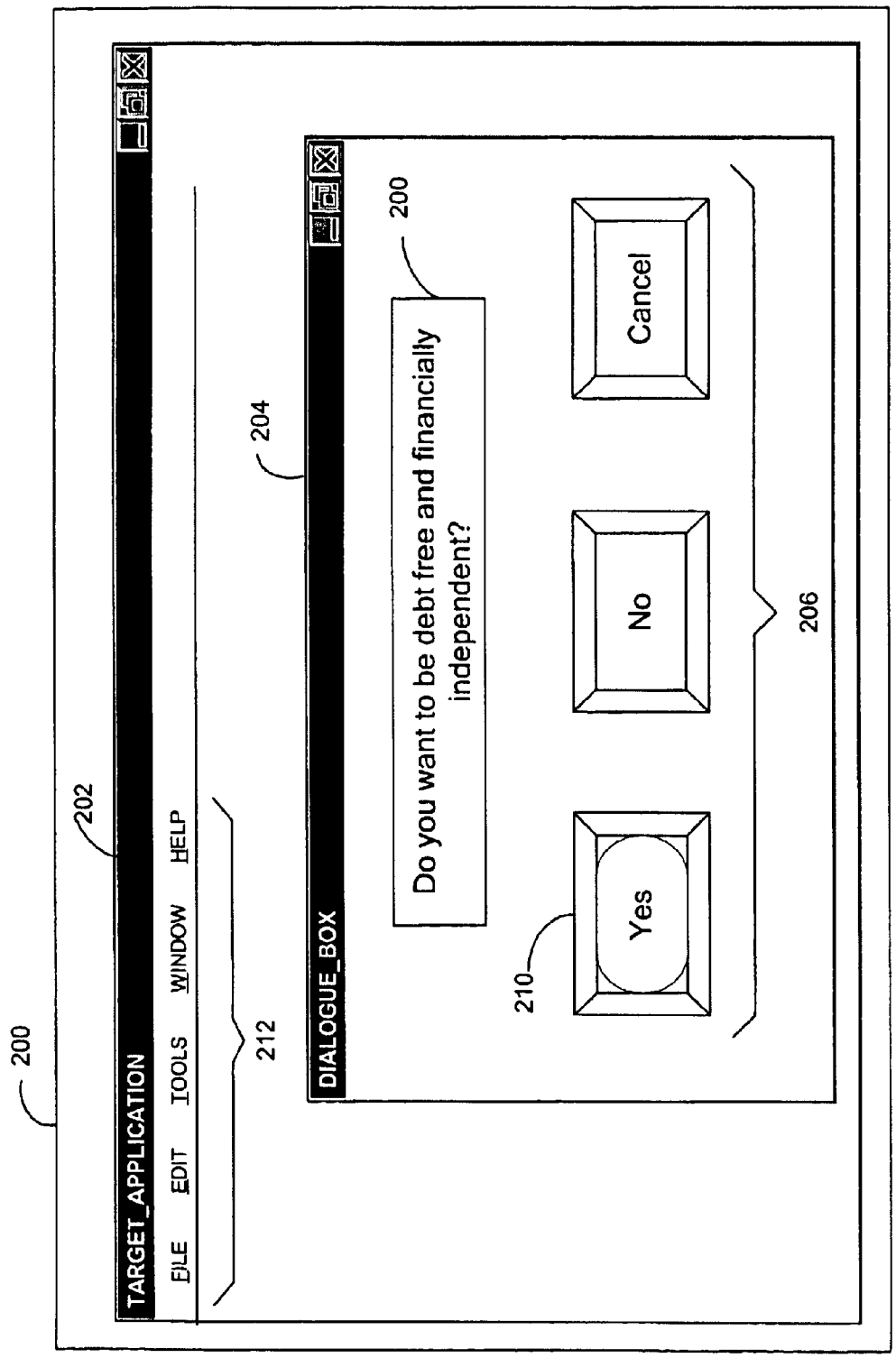
FIG. 2 is a diagram illustrating the target application within a user interface having a dialog box spawned as a result of an invoked action within the target application.

With reference now to FIG. 2, a target application 202 with a display object 204 is shown. The display object is spawned as a result of an invoked action within the target application, such as from clicking one of the menu items 212 with the mouse 161. Operating systems that support GUIs such as Windows, contain numerous types of display objects that are presented to a user interface 200, including user buttons 206, menu items 210 and dialogue boxes 204. In FIG. 2, the display object is a dialogue box 204 consisting of three user option buttons 206, where one of them 210 is owner drawn. The dialogue box 204 also consists of a text field 208 for displaying text characters, having defined font properties to the GUI. All of the buttons 206 shown within the dialogue box and the associated text field 208 are child controls of the dialogue box. A child control can be best described as a display object that is initiated by a parent object. In the illustration, the dialogue box 204 is the parent object, and has four children associated with it. Each of the objects has its own handle, which is a unique identification number assigned by the operating system 144 that distinguishes one object from another. The handles of the various display objects are also indicated in the resource file associated with the executable application. Hence, the dialogue box has its own unique handle, and each of its children has its own handle, which in many operating systems is inherited directly from the parent object.

It is common practice amongst software developers to obtain information related to a particular display object from the resource file, or by accessing the handle of the object directly. Once the handle of the object is known, the developer can view the graphics primitives and associated attributes of the object directly from the resource file. Examples of information that can be viewed include the various controls within the display objects, the placement of the object within the target application or parent window, the line properties, etc. However, while the graphics primitives of a display object may be obtained in this way, it is not possible to ascertain the font properties of display objects directly. This is because the font properties, which are attributes of a text primitive, are maintained within a temporary data structure provided by a device context. This data structure is not indicated within the resource file, and not maintained within memory after the text it relates to is drawn to the screen. Therefore, the only way to access the font properties of a text string or character is to instantly capture the font information from the data structure as it is drawn to the graphical user interface. The invention allows the font properties to be captured during runtime of the application.

Figure 3:
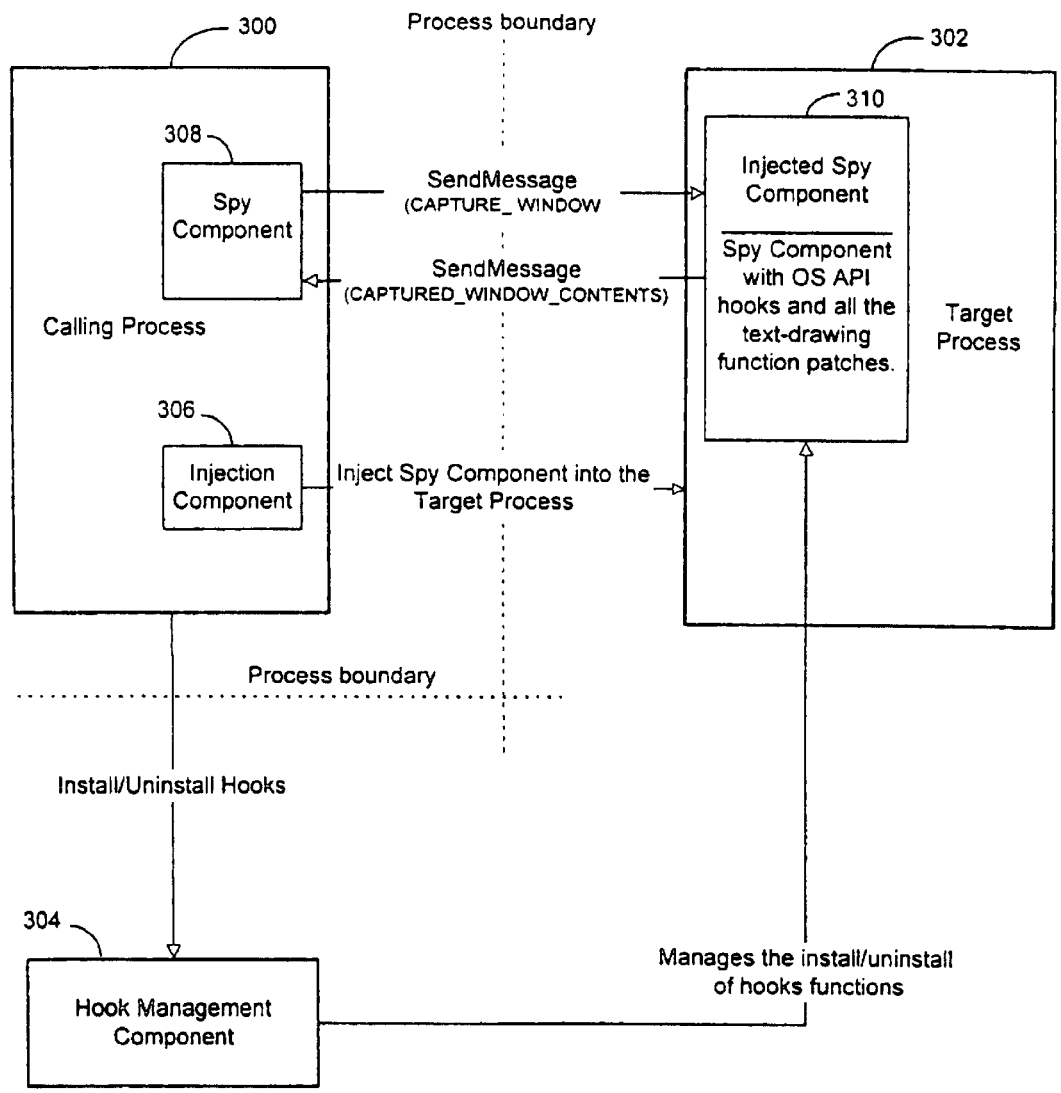
FIG. 3 is a functional block diagram illustrating the major components of the invention.
Figure 4:
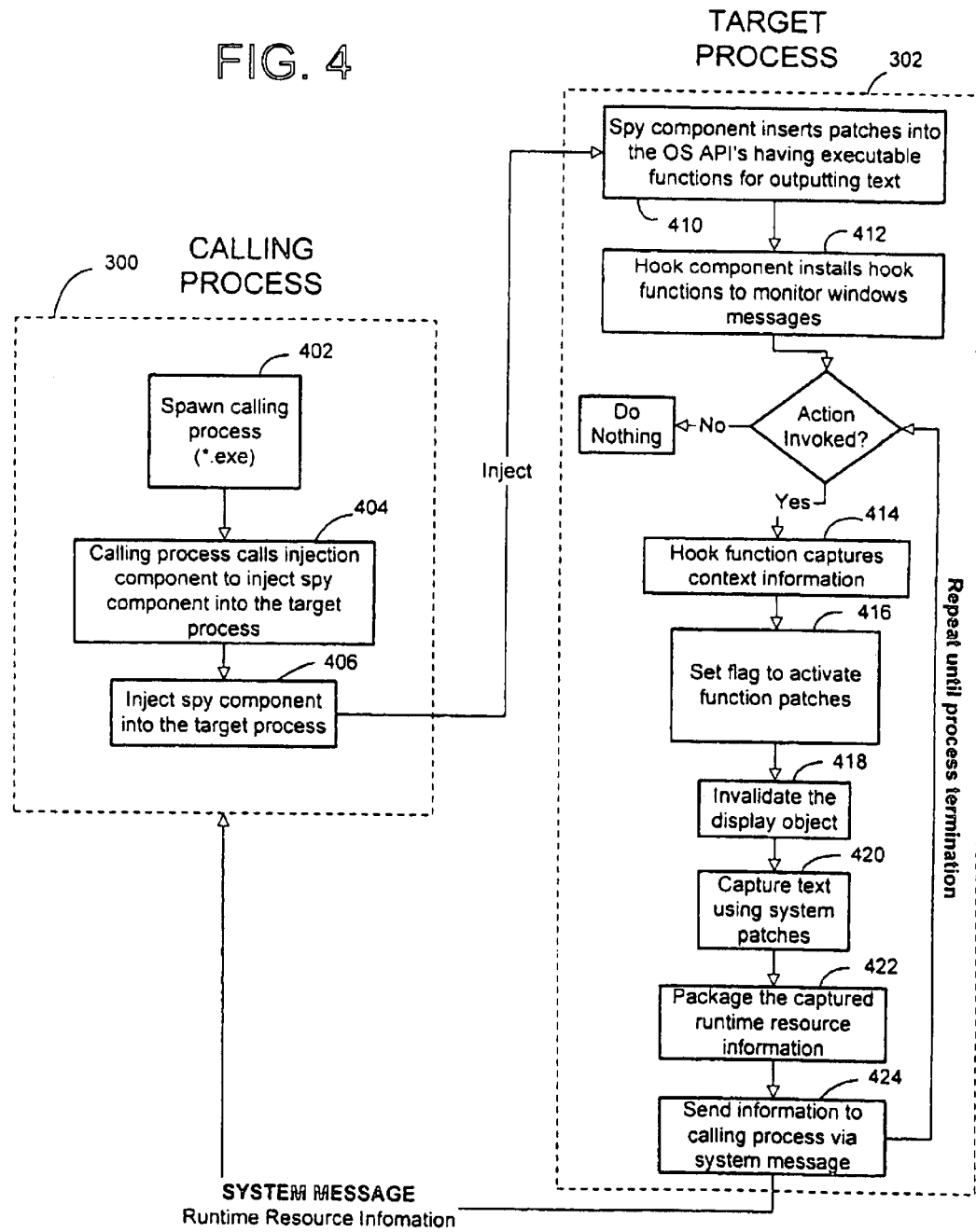
FIG. 4 is a flow chart illustrating the method executed by the calling process for capturing graphics primitives and system messages generated by the target process.

Specifically, with reference to FIG. 3 and the flowchart of FIG. 4, a calling process 300 injects DLLs into a target application 302 to "spy" on or monitor the operating system messages generated during target application execution. This technique is useful for determining the internal state of an application as it is in operation. A spy component 308 is used to perform the spying. It is an executable program module, such as a DLL, consisting of various functions and data for monitoring an application or process as it is in execution. The spy component 308 is injected into the target process or application 302 via an injection component 306 (event 406). This injection component 306 is invoked by the calling process 300 (event 404), which is an executable program module, such as a DLL, having executable instructions for injecting source code and/or program modules into a target process 302. Once the spy component is injected 310, it installs function patches into the operating system's application programming interfaces (APIs) that have executable instructions and routines for outputting graphics primitives to a user interface (event 410). For example, the primary API for Windows, known as Win32, provides a complete set of functions to format and draw text primitives in a target application's 302 user interface 200 (e.g.). These functions, such as DrawText( ), TextOut( ), and PolyTextOut( ) are responsible for outputting individual characters, symbols, or entire strings of text to the screen. Within the Windows environment, these are the functions that are patched by the spy component 308 after injection (event 410). The function patches serve the specific purpose of capturing the text that is rendered to the user interface screen 191 during the execution of the target process or application 302.

In addition to installing the function patches, the spy component installs one or more hook functions into the operating system's APIs to monitor system messages passed during execution of the target application/process 302 (event 412). Hook functions intercept system messages that are passed between the operating system and system threads during process execution. Whenever an action such as the pressing of a function key, click of a mouse, or activation of a dialogue box occurs, the OS generates a message that passes through a chain of hook procedures before reaching the target process. Standard hook functions are utilized to monitor the system messages that pertain specifically to the output of display objects to a user interface screen 191. In the Windows operating system for example, the WH_MSGFILTER and WH_SYSMSGFILTER hooks are used to monitor messages that are to be processed by a menu, scroll bar, message box, or dialog box.

The hook functions are installed and uninstalled accordingly by a hook management component 304, which is called upon by the spy component after it is injected 310 into the target process. The hook management component is a separate process from the calling process and target process, and has executable instructions for installing and uninstalling hook functions within a process or application designated by the spy component. In accordance with the invention, the designated process is the target process or application. Because the hook management component operates as an independent process, one or more calling processes can use the hook management component to install hooks within one or more target processes. In this way, the system messages of multiple independently running processes or applications can be monitored during runtime. As soon as an action is invoked within the target process 302 that results in the invocation of a display object, the generated message is captured by the one or more hook functions (event 414). This action results in the release of a trigger, or flag, that activates the function patches to capture the graphics primitives that are drawn to the screen to render the display object (event 416).

After enabling the function patches, the system messages captured by the one or more hook functions are then used to invalidate the display object under execution (event 418). The invalidation of a display object is a process whereby a selected or active display object is redrawn due to a user or system invoked change to the object. For instance, a display object is invalidated each time a user resizes the display object or moves it to a different position within the user interface 200. When such an action occurs, the display object is redrawn by calling the same API functions and routines that rendered it to the interface screen the first time. By using the system messages (which provide a context for the captured graphics primitives) captured by the hook functions, the appropriate API function calls are made, which in turn enumerates the display objects to the screen. As the display box is redrawn/invalidated, the installed function patches capture the graphics primitives, such as the text and other drawing elements that are drawn to the interface screen 200 (event 420). Thus, the graphics primitives and associated attributes of the graphics primitives related to the display object are captured in association with the context information provided by the system messages.

Finally, after the hook functions and function patches capture the graphics primitives including the font, and context information accordingly, this information is packaged into a data structure and sent to the calling process 300 as a system message (event 422 and 424). The process of capturing the graphics primitives and context information is continued for each invoked action within the target process, until execution is terminated. Because the hook functions and patches capture the runtime resource information on demand, the calling process receives this packaged information in an enumerated format.

Figure 5:
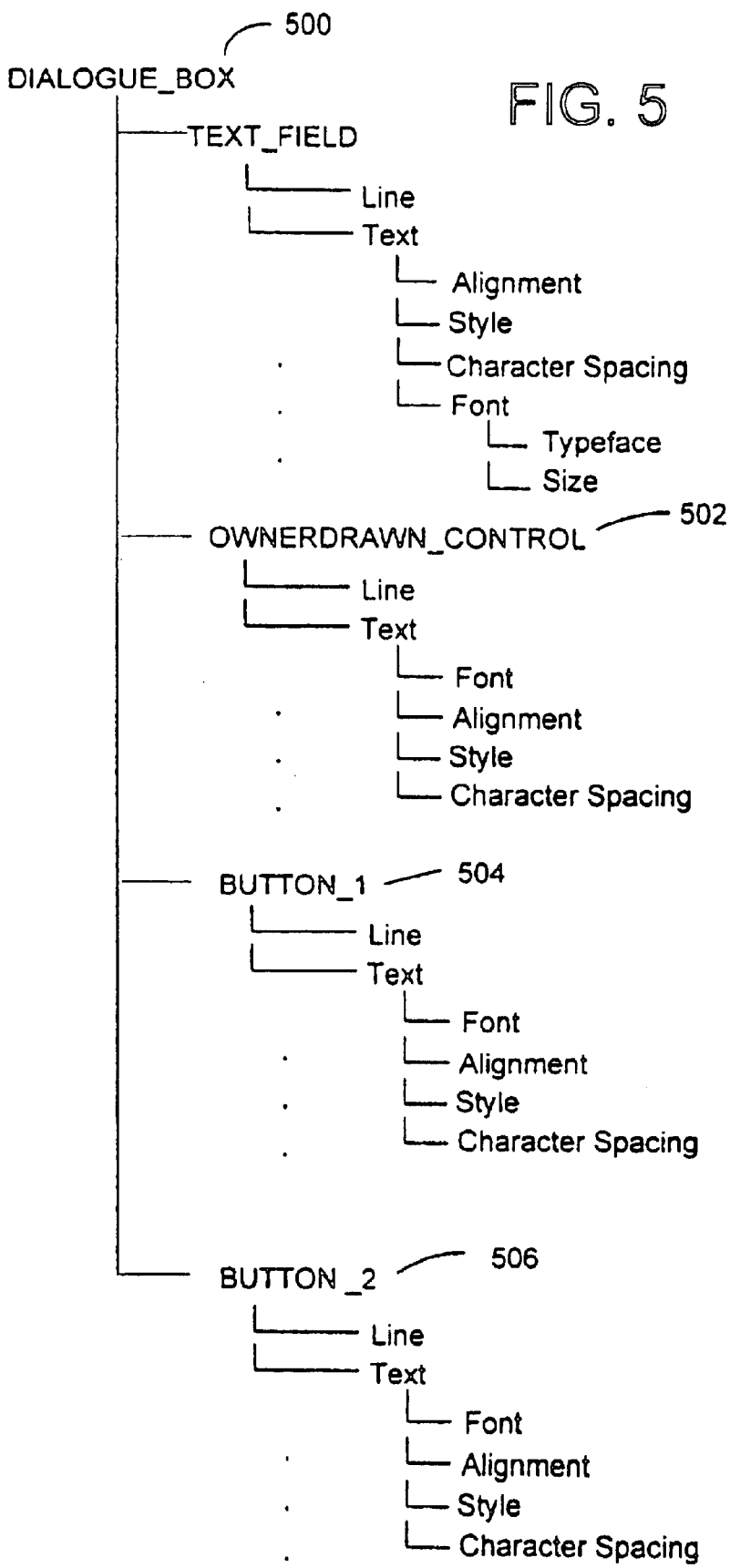
FIG. 5 is a diagram illustrating a data structure containing information descriptive of the graphics primitives that comprise a display object.

FIG. 5 is illustrative of the data structure containing the captured graphics primitives, associated attributes and context information related to the dialogue box 204 of FIG. 2. While this information is captured and retrieved in a similar format as shown in the figure, those skilled in the art will recognize that the actual data, and format of the data is dependent upon the type of action invoked within the target process. Moreover, the information contained within the data structure will differ from one type of display object to another, as each object can consist of various buttons, text fields, and other drawing elements. Therefore, the information that is captured and stored within the data structure will vary from one process to another.

In FIG. 5, the captured information includes data and parameters that are descriptive of the display object 204 both functionally and graphically. The object type as shown is a DIALOGUE_BOX 500, which further consists of other data and parameters that define its appearance and operation. These parameters include the object's four child controls, namely TEXT_FIELD 502, OWNER_DRAWN BUTTON 504, BUTTON_1 506, and BUTTON_2 508 (these names were assigned for illustrative purposes only). As shown in FIG. 2, each of the controls is a user button, and one of the buttons is owner drawn 210. Each button is a display object that is composed of one or more graphics primitives, such as text characters and lines that define its shape. Likewise, the primitives have unique attributes, such as font type, text size, line length and other stylistic characteristics. The sequential format of the information as shown in FIG. 5 is due to the function patches that capture the graphics primitives and associated attributes. As the display objects of the target application are enumerated to the screen, the graphics primitives and attributes of such primitives are instantly captured, stored in the data structure in the order in which the various attributes are drawn to the screen, and returned to the calling process. The ability to capture the graphics primitives and associated attributes of the graphics primitives in connection with the operating system messages passed during process execution (context information), results in the return of complete graphic information to the calling process.

The invention as described herein can be incorporated into the source code of a calling process directly, or called upon by the calling process to capture and retrieve the graphics primitives and associated context information of a display object. The calling process can be any computer executable application where the capture of the various graphics primitives that are output to a user interface by a target process is required. Once captured, the calling process can process this information accordingly. Examples of applications that can practice the capturing techniques disclosed include, but are not limited to localization tools, language processing applications and text-to-speech applications. Also, while the methods disclosed are applicable to various operating systems and platforms, the ability to capture graphics primitives and associated attributes in connection with context information can be particularly useful within the Windows OS to better support Active Accessibility applications. These types of applications are commonly used to make computer applications accommodating for people with physical disabilities, such as blindness or restricted mobility. By integrating the ability to capture graphics primitives and attributes of such primitives from a target process, Active Accessibility can be better supported within applications having display objects that are not native to the operating system itself (e.g. owner-draw controls). Indeed, the invention can be practiced in any system that requires or desires instant access to typographical or visual information from any display object that can be rendered to a user interface.

In this description, the invention is described with reference to acts and symbolic representations of operations that are performed by one or more computers such as the computer 110, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that the various acts and operations described hereinafter may also be implemented in hardware.

All of the references cited herein, including patents, patent applications, and publications, are hereby incorporated in their entireties by reference. In view of the many possible embodiments to which the principles of this invention may be applied, it should be recognized that the embodiment described herein with respect to the drawing figures is meant to be illustrative only and should not be taken as limiting the scope of invention. For example, those having skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for a calling process to manipulate information presented by a target process, the method comprising:
    injecting a spy component into the target process by the calling process, wherein the spy component is an executable program module;
    capturing one or more graphics primitives and attributes associated with such graphics primitives during execution of the target process;
    returning the graphics primitives and attributes associated with such graphics primitives to the calling process; and
    producing, by the calling process, an output, the output based, at least in part, on the returned graphics primitives and attributes associated with such graphics primitives.

2. The method of claim 1, wherein the step of injecting the spy component is performed by an injection component that is invoked by the calling process.

3. The method of claim 2, wherein the injection component is an executable program module comprising executable routines for injecting source code into a target process.

4. The method of claim 1, wherein the step of injecting includes inserting one or more function patches into one or more executable program modules that correspond to an operating system upon which the target process is being executed, the executable program modules having instructions for rendering graphics primitives to a graphical user interface.

5. The method of claim 4, wherein the step of inserting the function patches is performed by the spy component.

6. The method of claim 1, wherein the step of injecting includes installing one or more hook functions into the operating system APIs that generate system messages in the event of a display object being output to a user interface screen during the execution of the target process.

7. The method of claim 6, wherein the step of installing is performed by the spy component.

8. The method of claim 6, wherein the system messages provide context information that is descriptive of an invoked action within the target process.

9. The method of claim 6, wherein the one or more hook functions are installed by a hook management component that is called upon by the spy component after injection into the target process.

10. The method of claim 9, wherein the hook management component is responsible for uninstalling the one or more hook functions upon termination of the target process.

11. The method of claim 6, wherein the step of capturing includes calling the one or more hook functions to intercept any system messages generated as a result of an invoked action within the target process.

12. The method of claim 11, wherein the one or more hook functions set a flag to activate one or more function patches installed by the spy component.

13. The method of claim 1, wherein the step of capturing includes invalidating a display object that is output to a user interface as a result of an invoked action within the target process.

14. The method of claim 13, wherein the step of invalidating includes calling function patches to capture the graphics primitives and attributes associated with such graphics primitives as they are drawn to the user interface to render the display object.

15. The method of claim 1, wherein the step of returning includes sending context information captured by one or more hook functions to the calling process as a system message.

16. The method of claim 1, wherein the step of returning further includes sending the graphics primitives and attributes associated with such graphics primitives that are captured to the calling process as a system message.

17. The method of claim 1, wherein the calling process is selected from the group consisting of: a localization tool, a language-processing application a text-to-speech application, and an operating system utility.

18. The method of claim 1, wherein producing an output comprises performing an operation selected from the group consisting of: displaying an image on a display screen and producing an audio output.

19. A computer-readable medium having computer-executable instructions for a calling process to manipulate information presented by a target process, the computer-executable instructions performing steps comprising:

injecting a spy component into the target process by the calling process, wherein the spy component is an executable program module;

capturing one or more graphics primitives and attributes associated with such graphics primitives during execution of the target process;

returning the graphics primitives and attributes associated with such graphics primitives to the calling process; and producing, by the calling process, an output, the output based, at least in part, on the returned graphics primitives and attributes associated with such graphics primitives.

20. A system for manipulating information presented by a target process, the system comprising:

an injection component for injecting a spy component into the target process residing on a computer;

a spy component for capturing graphics primitives and attributes associated with such graphics primitives in connection with system messages that are generated by the target process as a result of an invoked action within the target process;

a hook management component for installing and uninstalling one or more hook functions into one or more program modules that are executed by an operating system residing on the computer, the program modules having instructions for generating system messages during the execution of the target process; and a calling process for producing an output based, at least in part, on the captured graphics primitives and attributes associated with such graphics primitives.

21. The system of claim 20, wherein the injection component is an executable program module consisting of executable instructions for injecting the spy component into the executable code of the target process.

22. The system of claim 20, wherein the injection component injects the spy component into the target process on behalf of the calling process.

23. The system of claim 22, wherein the calling process is a computer-executable application.

24. The system of claim 20, wherein the spy component inserts one or more function patches into one or more executable program modules that correspond to the operating system upon which the target process is being executed, the executable program modules having instructions for rendering graphics primitives to a graphical user interface.

25. The system of claim 24, wherein the function patches capture graphics primitives and associated attributes of such graphics primitives that are rendered to a user interface by a display object as a result of an action invoked within the target process.

26. The system of claim 25, wherein the spy component packages the graphics primitives and attributes associated with such graphics primitives and sends them to the calling process as a system message.

27. The system of claim 20, wherein the spy component calls the hook management component to insert one or more hook functions into one or more executable program modules that correspond to the operating system upon which the target process is being executed, the executable program modules having instructions for generating system messages in the event of a display object being output to a user interface during execution of the target process.

28. The system of claim 27, wherein the one or more hook functions set a flag to activate one or more function patches installed by the spy component.

29. The system of claim 27, wherein the one or more hook functions intercept any system messages generated as a result of an invoked action within the target process.

30. The method of claim 29, wherein the system message contain context information that is descriptive of an invoked action within the target process.

31. The system of claim 20, wherein the spy component packages context information and sends it to the calling process as an OS message.

32. The system of claim 20, wherein the hook management component is responsible for installing and uninstalling hook functions on behalf of the spy component.

33. The system of claim 32, wherein the hook functions are installed by the hook management component upon termination of the target process.

34. The system of claim 20, wherein the calling process is selected from the group consisting of: a localization tool, a language-processing application a text-to-speech application, and an operating system utility.

35. The system of claim 20, wherein producing an output comprises performing an operation selected from the group consisting of: displaying an image on a display screen and producing an audio output.

* * * * *